(12) United States Patent
Budiansky et al.

(10) Patent No.: US 6,277,191 B1
(45) Date of Patent: Aug. 21, 2001

(54) AIR ENTRAINMENT WITH POLYOXYALKYLENE COPOLYMERS FOR CONCRETE TREATED WITH OXYALKYLENE SRA

(75) Inventors: Noah D. Budiansky, Acton; Brent S. Williams, Cambridge; Byong-Wa Chun, Carlisle, all of MA (US)

(73) Assignee: W. R. Grace & Co.-Conn., New York, NY (US)

( * ) Notice: Subject to any disclaimer, the term of this patent is extended or adjusted under 35 U.S.C. 154(b) by 0 days.

(21) Appl. No.: 09/719,361

(22) PCT Filed: Jun. 14, 1999

(86) PCT No.: PCT/US99/13323

§ 371 Date: Dec. 11, 2000

§ 102(e) Date: Dec. 11, 2000

(87) PCT Pub. No.: WO99/65841

PCT Pub. Date: Dec. 23, 1999

Related U.S. Application Data
(60) Provisional application No. 60/089,700, filed on Jun. 18, 1998.

(51) Int. Cl.⁷ ............................. C04B 24/02; C04B 24/24; C04B 24/32; C08L 71/02
(52) U.S. Cl. ............................. 106/802; 106/724; 106/725; 106/727; 106/728; 106/808; 106/809; 106/810; 106/822; 106/823; 524/5
(58) Field of Search ............................. 106/724, 725, 106/727, 728, 802, 808, 809, 810, 822, 823; 524/5

(56) References Cited

U.S. PATENT DOCUMENTS

| | | | |
|---|---|---|---|
| 3,663,251 | 5/1972 | Moren et al. | 588/215 |
| 4,547,223 | 10/1985 | Gato et al. | 106/90 |
| 5,413,634 | 5/1995 | Shawl et al. | 106/696 |
| 5,556,460 | 9/1996 | Berke et al. | 106/823 |
| 5,603,760 | 2/1997 | Berke et al. | 106/802 |
| 5,618,344 | 4/1997 | Kerkar et al. | 106/823 |
| 5,779,788 | 7/1998 | Berke et al. | 106/809 |

FOREIGN PATENT DOCUMENTS 11-180747 * 7/1999 (JP) .

* cited by examiner

*Primary Examiner*—Anthony Green
(74) *Attorney, Agent, or Firm*—Craig K. Leon; William L. Baker

(57) ABSTRACT

The present invention relates to a method and air entraining admixtures (AEAs) for achieving satisfactory levels of air entrainment in a hydraulic cementitious composition, such as concrete or mortar, in which an oxyalkylene shrinkage reduction admixture (SRA) is used with, or to be used in combination with, a water soluble salt, such as a calcium salt. Addition of exemplary polyoxyalkylene copolymers, preferably nonionic and substantially di-block in structure, and preferably having a molecular weight of at least 1,000 and more preferably at least 2,000, are described for controlling air entrainment. Increased air entrainment effect is fiber realized when such polymers are used with conventional AEAs, such as tall oils and vinsol resin.

23 Claims, No Drawings

AIR ENTRAINMENT WITH POLYOXYALKYLENE COPOLYMERS FOR CONCRETE TREATED WITH OXYALKYLENE SRA

This application is filed under §371 based on PCT/US99/13323, filed Jun. 14, 1999, which claims benefit of U.S. patent application Ser. No. 60/089,700, filed Jun. 18, 1998.

FIELD OF THE INVENTION

The present invention relates to the field of concrete admixtures, and more particularly to controlling air entrainment in hydraulic cementitious compositions treated with oxyalkylene shrinkage reducing admixtures ("SRAs") and/or water soluble salts such as calcium nitrite and/or calcium nitrate.

BACKGROUND OF THE INVENTION

Air entrainment is important for increasing resistance of hydraulic cementitious compositions, such as mortar, masonry, and concrete, to frost attack and deterioration due to repeated freezing and thawing. Entrained air is desirable, therefore, for long-term durability of concrete or mortar in adverse freeze-thaw conditions.

Technically speaking, air entraining agents or admixtures (AEAs) do not generate air in the concrete, but merely stabilize the air either (1) infolded and mechanically enveloped during mixing, (2) dissolved in the mix water, (3) originally present in the intergranular spaces in the dry cement and aggregate; or (4) in the pores of the aggregate. While it is true that the entrained air is within the total mass of concrete, it is only entrained in the paste portion of the mix.

Entrained air is fundamentally different than "entrapped" air. Most of the air that is in concretes, in the absence of admixtures, is often referred to as "entrapped" air. Entrained air is characterized by uniformly dispersed, spherical spaces in cement paste; whereas entrapped air is characterized by irregularly shaped voids which are not generally uniformly sized but generally larger than "entrained" air voids. See e.g., *Concrete Admixtures,* Vance Dodson (Van Nostrand Reinhold, New York 1990), P. 129 et seq.

The present inventors have discovered an air entrainment problem that arises when oxyalkylene based shrinkage reducing admixtures (SRAs), in concrete and mortar, are used in conjunction with water soluble salts. Oxyalkylene SRAs are known in the art. For example, U.S. Pat. No. 5,413,634 of Shawl et al., incorporated herein by reference, discloses an alkyl ether derivative of an aliphatic polyhydroxy compound containing an oxyalkylene group.

When an oxyalkylene SRA is used with a water soluble salt (such as calcium nitrite), however, sufficient and controllable levels of entrained air are difficult to attain. This was found to be the case even when the SRAs were used in combination with conventional air entraining agents, such as tall oil and vinsol resin. Accordingly, a novel air entraining admixture or system is needed.

SUMMARY OF THE INVENTION

In surmounting the difficulties of the prior art, the inventors have discovered that polyoxyalkylene copolymers provide stable and controllable entrained air, in concrete and mortar, with oxyalkylene shrinkage reducing admixtures (SRAs) and particularly for such SRAs used in combination with water soluble salts, such as alkali or alkaline earth metal salts, preferably calcium salts such as calcium nitrite, calcium nitrate, or a mixture thereof.

An exemplary method of the invention, for improving air entrainment in a hydraulic cementitious composition having an oxyalkylene SRA, comprises introducing to the oxyalkylene SRA a polyoxyalkylene copolymer. Preferably, the copolymer is a nonionic block copolymer, preferably having a predominantly di-block structure, and having a molecular weight of at least 1000. Further exemplary methods include introducing into a hydraulic cementitious composition an oxyalkylene SRA, a water soluble salt, (preferably a calcium salt, e.g., calcium nitrite), and a polyoxyalkylene di-block copolymer. These can be added separately or combined as one or two components.

Exemplary admixtures of the invention comprise a mixture of an oxyalkylene SRA, optionally a water soluble salt (e.g., calcium nitrite), and a polyoxyalkylene copolymer. In further exemplary embodiments, an additional and conventional AEA, such as tall oil, vinsol resin, can be used to improve air entrainment further. The present invention further relates to cement compositions comprising an oxyalkylene SRA, a water soluble salt (e.g., calcium nitrite), and a polyoxyalkylene copolymer.

In especially preferred methods and admixtures, an oxyalkylene SRA comprising di-propylene-t-butyl ether is added to the cementitious composition with a polyoxyalkylene copolymer which comprises a block-like structure comprised substantially of polyethylene oxide and another block-like structure comprised substantially of a higher polyalkylene (such as oxypropylene and/or oxybutylene) groups, the copolymer having a molecular weight of at least 1000, preferably at least 2000, and more preferably at least 4000. Further features and advantages of the invention are described hereinafter.

DETAILED DESCRIPTION OF THE INVENTION

The term "cement composition" as may be used herein refers to pastes, mortars, grouts such as oil well cementing grouts, and concrete compositions comprising a hydraulic cement binder. The terms "paste", "mortar" and "concrete" are terms of art: pastes are mixtures composed of a hydraulic cement binder (usually, but not exclusively, Portland cement, Masonry cement, or Mortar cement and may also include limestone, hydrated lime, fly ash, blast furnace slag, and silica fume or other materials commonly included in such cements) and water; mortars are pastes additionally including fine aggregate, and concretes are mortars additionally including coarse aggregate. The cement compositions tested in this invention are formed by mixing required amounts of certain materials, e.g., a hydraulic cement, water, and fine or coarse aggregate, as may be applicable to make the particular cement composition being formed.

The present invention allows for air entrainment in concrete containing oxyalkylene SRAs in conjunction with water soluble salts (especially calcium salts, and particularly calcium nitrite). It has been unexpectedly found that small doses of relatively higher molecular weight (e.g., at least 1,000) polyoxyalkylene copolymers (non-ionic, primarily di-block) provide stable, controllable, and desirable degrees of entrained air in concrete containing the above durability enhancing admixtures.

Exemplary polyoxyalkylene copolymers suitable for use in the invention preferably have substantially block, more preferably predominantly di-block, structures. A preferred polyoxyalkylene copolymer, having approximately 4000 molecular weight (50% by weight polyethylene, 50% by weight polypropylene, di-block polymer) was obtained from Arco Chemical under the tradename POLYOL R2633, and tested as described Her below.

Other exemplary polyoxyalkylene copolymers suitable for use in the present invention have the following general formula:

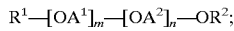

or

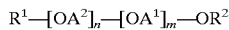

wherein $R^1$ and $R^2$ comprise a hydrogen, an alkyl group (e.g., $C_1$–$C_7$), a cyclo alkyl group (e.g., $C_5$–$C_6$), or an aryl group; $OA^1$ is a generally hydrophilic oxyalkylene group wherein O represents oxygen and $A^1$ comprises primarily ethylene groups; and $OA^2$ is a generally hydrophobic oxyalkylene group wherein O represents oxygen, and $A^2$ comprises primarily propylene groups (including isopropylene), butyl groups (including t-butyl), or a mixture thereof; m is an integer of 5–200; and n is an integer of 5–200. Preferably, the sum of m and n is in the range of 10 to 400. More preferably, m and n are each an integer of about 30–60. $R^1$ and $R^2$ are preferably a hydrogen or methyl group. The polyoxyalkylene copolymer may have a molecular weight of about 100–10,000 (EO/PO block form), and preferably at least 1,000; more preferably, at least 2,000; and most preferably at least 4,000 mol. weight. The foregoing statement that $A^1$ comprises primarily ethylene groups is an acknowledgment that "$OA^1$" may not be purely ethylene oxide, but may include a small portion (less than 50% and preferably less than 20%) larger alkylenes such as propylene or butylene. In other words, the ethylene oxide group should predominate in $OA^1$ because this is believed to confer hydrophilicity to the copolymer. Similarly, the foregoing statement that $A^2$ comprises predominantly higher alkylene groups, namely propyl and/or butyl groups, is an acknowledgment that $OA^2$ may not be pure but may contain some ethylene groups but the propyl and/or butyl groups should predominate since these higher alkyl groups are believed to confer hydrophobicity to the copolymer. The combination of hydrophilicity and hydrophobicity is therefore desired.

Exemplary oxyalkylene shrinkage reduction admixtures (SRAs) which are believed to be suitable for purposes of the present invention include alkyl ether derivatives of aliphatic polyhydroxy compounds such as glycerin. Dialkyl ether derivatives, especially tertary butyl ethers of glycerin are preferred. An especially preferred SRA is di-propylene glycol tertiary-butyl ether ("DTBE"), combined with di-propylene glycol, which is available from W. R. Grace & Co. -Conn., Cambridge, Mass., under the tradename ECLIPSE™.

U.S. Pat. Nos. 3,663,251 and 4,547,223, for example, suggest the use of compounds of the general formula $RO(AO)_nH$ in which R may be a $C_1$–$C_7$ alkyl or $C_5$–$C_6$ cycloalkyl radical, A may be a $C_2$–$C_3$ alkylene radical, and n is 1–10, as shrinkage reducing additives for cement The references are incorporated as if fully set forth herein.

A further oxyalkylene SRA suitable for use in the invention is disclosed in U.S. Pat. No. 5,556,460 of Berke et al., which is incorporated herein by reference. Berke et al. disclosed an SRA admixture comprising a low molecular weight oxyalkylene compound and a comb polymer having carboxylic acid groups and oxyalkylene units therein. More particularly, such an exemplary SRA comprises: (A) at least one oxyalkylene glycol, oxyalkylene ether glycol or mixtures thereof having a molecular weight up to about 4000; and (B) a comb polymer of a molecular weight of from 2,000 to 100,000 having (i) carboxylic acid anhydride, free carboxylic acid or its ammonium, alkali or alkaline earth metal salt and (ii) $C_2$–$C_5$ oxyalkylene units or mixtures of said units, wherein said units (i) or (ii) being pendant from the polymer backbone chain and said units (ii) provide the majority of the molecule. The at least one oxyalkylene compound may be selected from (i) oxyalkylene glycols represented by the formula HOAOH or $HO(AO)_nH$ wherein A represents a $C_2$–$C_{10}$ alkylene group, O represents an oxygen atom, and n represents an integer of from 1 to about 80; (ii) oxyalkylene adducts of monoalcohols represented by the formula $RO(AO)_mH$ wherein R represents a $C_1$–$C_7$ alkyl or a $C_5$–$C_6$ cycloalkyl group, A represents a $C_2$–$C_4$ alkylene group, O represents an oxygen atom and m represents an integer of from 1 to about 10; and (iii) oxyalkylene adducts of polyols represented by the formula $Q[(OA)_pOR']_x$ wherein Q represents a $C_3$–$C_{12}$ aliphatic hydrocarbon residual group of a polyhydroxyalkane, each R' independently represents a $C_1$–$C_{14}$ alkyl or cycloalkyl group or hydrogen atom provided at least one R' of said adduct represents a $C_1$–$C_{14}$ alkyl or cycloalkyl group; A represents a $C_2$–$C_4$ alkylene group; O represents an oxygen atom; p represents an integer of from 0 to about 10; and x represents an integer of from 3 to 5; and (iv) mixtures of said oxyalkylene compounds.

Still her exemplary oxyalkylene SRAs suitable for use in the invention may comprise oxyalkylene ether adducts with higher alkylene diols, as described in U.S. Pat. No. 5,618,344 of Kerkar et al., incorporated herein by reference.

It is further known in the art to combine oxyalkylene SRAs with alkylene glycols, as discussed for example in Taiwan Patent No. NI-076751 issued Jun. 13, 1996, to Arco Chemical Technology, L.P., which is incorporated herein by reference. The Taiwan patent disclosed a mixture of (a) at least one alkyl ether oxyalkylene adduct represented by the formula $RO(AO)_nH$ wherein A is an alkylene (e.g., $C_2$–$C_4$) group, O is an oxygen atom, R is an alkyl group (e.g., $C_3$–$C_5$), and n is an integer from 1 to 3; and (b) an oxyalkylene glycol represented by the formula $HO(AO)_mH$ wherein A is an alkylene radical (e.g., $C_2$–$C_4$), O is an oxygen atom, and m is an integer of 1 to 3. Preferred SRAs of component (a) include, therefore, dipropylene glycol t-butyl ether, tripropylene glycol t-butyl ether, and mixtures thereof. Preferred oxyalkylene glycols of component (b) include dipropylene glycol, tripropylene glycol, and mixtures thereof. Accordingly, the present invention includes combinations of oxyalkylene SRAs, such as the ones described above, with conventional AEAs such as dipropylene glycol or other short chain glycols, in addition to the polyoxyalkylene copolymers described herein as part of the novel AEA admixtures.

Exemplary water soluble salts which may be used in the invention include cations such as $Ca^{++}$, $Na^+$, $H^+$, $K^+$, $Mg^{++}$, $Cs^+$, $Rb^+$, $Fr^+$, or a mixture thereof, in combinations with anions such as nitrates (—$NO_3$), nitrites ($NO_2$), chlorides (—Cl), and thiocyanates (—SCN). Preferred salts are calcium nitrite, calcium nitrate, or a mixture thereof. Other exemplary salts include $CaCl_2$, $NaNO_3$, $NaS_2O_4$, and NaCl.

In exemplary methods and admixture compositions of the present invention, the amounts of the various components may be used in the general ranges, depending upon the nature of the mix and quality of the cement: oxyalkylene SRA and water soluble salt, each in the range of about 0.01–10% s/s (percentage weight solids based on weight of cement), and more preferably 0.05–5% s/s; and polyoxyalkylene copolymer in the range of about 0.005–5.0% s/s, and more preferably 0.01–0.5% s/s.

oxyalkylene SRA and calcium nitrite (#4), and the entrained air fell to 1.5%, which was a remarkable drop from sample #2 (SRA alone) and #3 (salt alone). In each of samples #5 tough #8, the amount of the conventional air entraining admixture (tall oil) was increased; but the percentage of entrained air did not return to the level of either SRA or salt alone (#3, #4). The amount of tall oil was measured in terms of percentage weight solids based on 100 parts weight of cement. The results are tabulated in Table 1 below.

TABLE 1

| MIX | SRA oz/cwt | Salt (CaNi) Gal/Y | Conventional AEA | % s/s | Polyoxyalkylene Copolymer | Total Air % | Entrained Air % |
|---|---|---|---|---|---|---|---|
| #1 | — | — | — | — | none | — | 4.4 | 0.0 |
| #2 | 22.5 | — | Tall oil | 0.0133 | none | — | 20.6 | 16.2 |
| #3 | — | 3 | Tall oil | 0.0133 | none | — | 12.0 | 7.6 |
| #4 | 22.5 | 3 | Tall oil | 0.0133 | none | — | 5.9 | 1.5 |
| #5 | 22.5 | 3 | Tall oil | 0.000 | none | — | 5.5 | 1.1 |
| #6 | 22.5 | 3 | Tall oil | 0.010 | none | — | 6.3 | 1.9 |
| #7 | 22.5 | 3 | Tall oil | 0.020 | none | — | 7.0 | 2.7 |
| #8 | 22.5 | 3 | Tall oil | 0.030 | none | — | 7.5 | 3.1 |

The invention may be more readily comprehended when the following examples are considered.

EXAMPLE 1

A series of micro-concrete mixes were prepared to determine air entrainment characteristics of samples having a conventional air enter and an oxyalkylene SRA with a water soluble salt, such as calcium nitrite.

The micro-concrete was made by blending 1500 parts Type I Portland Cement (170-1) with a mixture of the following ASTM-graded sands: 1040 parts F-95 sand, 945 parts C-109 sand, 945 parts C-185 sand, and 1796 parts Q-Rok sand. The dry blending was conducted in a Hobart mixer for approximately 30 seconds to attain a uniform blend having an aggregate to cement ratio of 3:15. A 0.50 water/cement (w/c) ratio with no additional superplasticizers, air entrainers or other admixtures was used as a baseline for a level (4.4%) of total entrapped air (See #1 mix, "control"). To the dry blend of aggregate and cement, 750 g of water was added during the first 40 seconds of mixing time. A mixing schedule proceeded as follows: 0–40 seconds (water, admixtures added), 0–5 minutes mixing at the lowest speed setting, 5–8 minutes rest (covered), 8–9 minutes mixing (uncovered). After 9 minutes, air content was determined by ASTM C-185 test protocol. Slump was determined by JIS Stanard # A-1173.

The above procedure was repeated for the remaining mixes in which an oxyalkylene SRA (available from Grace under the name "ECLIPSE™") was added (mix #2), a water soluble salt such as calcium nitrite (sold by Grace under the tradename "DCI®") was added (mix #3), each with a conventional tall oil air entraining agent (DAREX® II). The water/cement ratio was reduced when naphthalene sulphonate based superplasticizers were used to keep the flow the same as the reference (control) mix. A water cement ratio of 0.45 was used. A sample mix was made using both the As seen in Table 1, when a conventional air entrainer such as tall oil at a dosage of 0.0133% s/s is used to entrain air in mortar containing typical doses of the oxyalkylene SRA ("ECLIPSE™" brand) and water soluble salt ("DCI®" brand calcium nitrite sold as a corrosion inhibitor), it was found that only 1.5% air was entrained (See mix #4). At higher doses, slightly more air (up to 3.1% in mix #8) was entrained but not enough for optimum freeze thaw resistance in mortar.

EXAMPLE 2

Further testing was done on SRA/salt mixtures along the lines described above using a polyoxyalkylene copolymer (Arco Polyol R2633, 4000 molecular weight, 50% by weight polyethylene, 50% by weight polypropylene, di-block). This revealed a surprising and unexpected effect on air entrainment. In sample mix #9, the SRA ("ECLIPSE™") and salt ("DCI®") were mixed and dosed with ARCO POLYOL R2633, and 5.2% entrained air was obtained. This was substantially larger than the 3.1% air entrained by the conventional air entrainer (see mix #8, example 1). In a further sample mix (#10), the polyethylene-polypropylene glycol AEA was also used with a conventional tall oil AEA (available from Grace under the tradename DAREX® II), and the entrained air was 21.5%; this was surprising. In yet a further sample mix (#11), the polyoxyalkylene copolymer AEA was used with a conventional vinsol resin (available from Grace under the tradename DARAVAIR® 1000), and the entrained air was 19.3% which was surprising. The data clearly indicates that the use of the polyoxyalkylene copolymer AEA in conjunction with conventional AEAs has a synergistic effect resulting in controllable and desirable levels of entrained air in mortar. The results are provided in Table 2 below.

TABLE 2

| MIX | SRA oz/cwt | Salt (CaNi) Gal/Y | Conventional AEA | | Polyoxyalkylene Copolymer | | Total Air | Entrained Air |
|---|---|---|---|---|---|---|---|---|
| | | | | % s/s | ID # | (% s/s) | % | % |
| #9 | 22.5 | 3 | — | — | R2633 | 0.02 | 9.5 | 5.2 |
| #10 | 22.5 | 3 | Tall Oil | 0.0133 | R2633 | 0.02 | 25.8 | 21.5 |
| #11 | 22.5 | 3 | Vinsol Resin | 0.00665 | R2633 | 0.02 | 23.6 | 19.3 |

In view of mix nos. 10 and 11, which contained conventional AEAs, the present invention further comprises the use of conventional AEAs in combination with the polyoxyalkylene copolymer, a combination which is seen to provide synergistic increases in the level of air entrainment.

Accordingly, the present invention is also directed at novel AEA combinations for oxyalkylene SRAs, comprising a polyoxyalkylene copolymer as described above (preferably nonionic, predominantly di-block in structure, with a molecular weight of at least 1000), and a second AEA which has a different structure than the copolymer.

The second AEA may, for example, comprise one or more known AEAs, such as a fatty alkanolamids, ethoxylated fatty amine, ethoxylated fatty acid, ethoxylated triglyceride, ethoxylated alkylphenol, ethoxylated alcohol, alkyl ethoxylate, alkylaryl ethoxylate; a cationic AEA such as amine ethoxylate and amine oxide; an amphoteric AEA such as a betaine; an anionic AEA such as a fatty alkyl ether sulfate, a fatty alkylaryl ether sulfate, a alkyl benzene sulfonate, a sulfosuccinate, a fatty sulfonate, or a mixture thereof.

As previously mentioned, di-propylene glycol and/or tripropylene glycol may be used as, or with, other conventional AEAs.

The present invention is also directed to novel cement compositions which comprise an oxyalkylene SRA (preferably di-propylene glycol t-butyl ether), a calcium salt (preferably calcium nitrite); a polyoxyalkylene copolymer; and optionally one or more conventional AEAs, such as dipropylene glycol, tripropylene glycol (or other short chain oxyalkylene polymers), or other AEAs as previously described above.

The foregoing examples are provided by way of illustration only and are not intended to limit the scope of the invention.

EXAMPLE 3

Further testing was conducted in laboratory concrete. Mixes containing: 611 lbs./yd of cement, 1229 lbs./yd fine aggregate, 1700 lbs./yd coarse aggregate, 270 lbs./yd water (0.44 W/C) were mixed according to laboratory practices. Slump, air content (by pressure method), and unit weight were tested immediately is after mixing. As seen in Table 3, mixes containing the SRA, water soluble salt (DCI® brand sold as a corrosion inhibitor), superplasticizer, and conventional air entrainer produced unacceptable air contents (Mixes 1 and 2). As seen in these microconcrete mixes, the addition of a small amount of oxyalkylene copolymer (ARCO® R2633) aided in producing acceptable entrained air contents. In Table 3, mixes 3, 4, and 5 show these results

TABLE 3

| Mix | Salt (CaNi) gal/yd | SRA gal/yd | Conventional AEA | | Polyethylene Polypropylene Glycol Polymer AEA % s/s | Total Air % | Entrained Air % |
|---|---|---|---|---|---|---|---|
| | | | | % (s/s) | | | |
| 1 | 3 | 1.5 | Vinsol Resin | 0.0098 | 0 | 2.8 | 0 |
| 2 | 3 | 1.5 | Anionic Surfactant | 0.0103 | 0 | 3.6 | 0 |
| 3 | 3 | 1.5 | Vinsol Resin | 0.0016 | 0.0025 | 10 | 7.2 |
| 4 | 3 | 1.5 | Tall Oil | 0.0033 | 0.0025 | 10.5 | −7.3 |
| 5 | 3 | 1.5 | Anionic Surfactant | 0.0017 | 0.0025 | 10 | 6.4 |

EXAMPLE 4

Concrete testing was farther tested in field applications. Six sites were used for field testing opportunities of oxyalkylene copolymer (ARCO® R2633) when SRAs and water-soluble salt admixtures were required. Concrete mixes ranged in cement, pozzolan, coarse aggregate, fine aggregate, and water/cement ratio (W/C). Mix proportions are shown in Table 4. In all mixes, SRA, water-soluble salt admixture, superplasticizer, and conventional air entrainer were added prior to initial air tests.

In Trial 1, Tests 1 and 2, the oxyalkylene copolymer (ARCO R2633) was added up front in the truck before air tests were conducted. Additional copolymer was added after initial air tests to desired air was attained. In trials two through six, an initial air reading was taken prior to copolymer addition. As in seen mixes two through six, significant increases in entrained air were seen with the addition of the oxyalkylene copolymer. The results are shown below.

TABLE 4

| Site | Cement Factor lb/yd³ | Pozzolan | Fine Aggregate | Coarse Aggregate | W/C |
|---|---|---|---|---|---|
| 1 | 525 | 125 | 10007 | 1850 | .44 |
| 2 | 564 | | 1313 | 1764 | .46 |
| 3 | 630 | | 1274 | 1965 | .43 |
| 4 | 593 | | 1240 | 1800 | .44 |
| 5 | 630 | | 1274 | 1965 | .42 |
| 6 | 630 | | 1274 | 1965 | .42 |

TABLE 5

| Trial | Salt (CaNi) gal/yd | SA gal/yd | Conventional Vinsol Resin % (s/s) | Initial Air % | Polyethylene Polypropylene Polymer AEA % (s/s) | Final Air % | Entrained Air % |
|---|---|---|---|---|---|---|---|
| Trial 1 Test 1 | 3 | 1.5 | 0.0016 | 2.7 | 0.0151 | 5.6 | — |
| Trial 1 Test 2 | 3 | 1.5 | 0.0016 | 4.5 | 0.0253 | 5.5 | — |
| Trial 2 | 3 | 1.5 | .008 | 2.4 | 0.0164 | 4.5 | 2.1 |
| Trial 3 | 3 | 1.5 | 0.0016 | 1.7 | 0.0082 | 7.2 | 5.5 |
| Trial 4 | 2.5 | 1.5 | 0.0016 | 1.8 | 0.0131 | 4.8 | 3 |
| Trial 5 | 3 | 1.5 | 0.0016 | 1.7 | 0.0082 | 7.2 | 5.5 |
| Trial 6 Test 1 | 3 | 1.5 | 0.0016 | N/A | 0.0082 | 7.6 | 5.9 |
| Trial 6 Test 2 | 3 | 1.5 | 0.0016 | N/A | 0.0082 | 5.3 | 3.6 |
| Trial 6 Test 3 | 3 | 1.5 | 0.0016 | N/A | 0.0082 | 5.5 | 3.8 |

It is claimed:

1. A method for improving air entrainment in a cementitious composition having an oxyalkylene shrinkage reduction admixture, comprising introducing to the shrinkage reduction admixture a polyoxyalkylene copolymer having a di-block structure

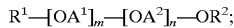

$$R^1-[OA^1]_m-[OA^2]_n-OR^2;$$

or

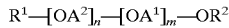

$$R^1-[OA^2]_n-[OA^1]_m-OR^2$$

wherein $R^1$ and $R^2$ represent hydrogen, an alkyl group, a cyclo alkyl group, or an aryl group; $OA^1$ represents an oxyalkylene group wherein O represents oxygen and $A^1$ represents ethylene groups; and $OA^2$ represents an oxyalkylene group wherein O represents oxygen and $A^2$ represents propylene groups, butylene groups, or mixture thereof; m is an integer of 5–200; and n is an integer of 5–200; said method further comprising adding an alkali or alkaline earth metal salt into the cementitious composition; said shrinkage reduction admixture and said salt being present in the cementitious composition in the amount of 0.1–10% s/s based on the weight of cement in the composition, and said polyoxyalkylene copolymer being present in the cementitious composition in the amount of 0.005–5.0% s/s based on the weight of cement in the composition.

2. The method of claim 1 wherein said salt comprises a calcium salt.

3. The method of claim 2 wherein said calcium salt comprises calcium nitrite, calcium nitrate, or a mixture thereof.

4. The method of claim 1 wherein said shrinkage reduction admixture has the general formula $RO(AO)_nH$ in which R represents hydrogen, an alkyl group, a cycloalkyl group, or an aryl group; A represents an-alkylene radical, and n is an integer 1–10.

5. The method of claim 1 wherein said shrinkage reduction admixture comprises an alkyl ether derivative of an aliphatic polyhydroxy compound of the formula $Q-[(A)_n-OR)]_x$ wherein Q represents a $C_3-C_{12}$ aliphatic hydrocarbon group, R represents hydrogen or a $C_1-C_{16}$ alkyl, at least one R being a $C_1-C_{16}$-alkyl group, A represents a $C_2-C_4$ oxyalkylene group, n is 0–10, and x is 3–5.

6. The method of claim 1 wherein the sum of m and n is in the range of 10 to 400.

7. The method of claim 1 wherein m and n are each an integer of about 20–70.

8. The method of claim 1 wherein m and n are each an integer of 30–60.

9. The method of claim 1 wherein both $R^1$ and $R^2$ represent hydrogen or methyl.

10. The method of claim 1 wherein said polyoxyalkylene copolymer has a molecular weight of at least 1000.

11. The method of claim 1 wherein said polyoxyalkylene copolymer has a molecular weight of at least 2000.

12. The method of claim 1 wherein said oxyalkylene shrinkage reduction admixture is di-propylene glycol t-butyl ether, and said polyoxyalkylene copolymer has a molecular weight of at least 2000.

13. The method of claim 11 further comprising adding an air entraining agent comprising an alkylene glycol polymer.

14. The method of claim 1 further comprising adding an air entraining agent selected from the group consisting of dipropylene glycol, tripropylene glycol, a tall oil, and vinsol resin.

15. The method of claim 1 comprising adding a further air entraining agent selected from the group consisting of fatty alkanolamide, ethoxylated fatty amine, ethoxylated fatty acid, ethoxylated triglyceride, ethoxylated alkylphenol, ethoxylated alcohol alkyl ethoxylate, alkylaryl ethoxylate, a cationic air entraining agent, an amphoteric air entraining agent, and an anionic air entraining agent.

16. The method of claim 15 wherein said further air entraining agent is a cationic air entraining agent selected from the group consisting of amine ethoxylate and amine oxide.

17. The method of claim 15 wherein said further air entraining agent is amphoteric.

18. The method of claim 17 wherein said further amphoteric air entraining agent is a betaine.

19. The method of claim 15 wherein said further air entraining agent is an anionic air entraining agent selected from a fatty alkyl ether sulfate, a fatty alkylaryl ether sulfate, a alkyl benzene sulfonate, a sulfosuccinate, and a fatty sulfonate.

20. The method of claim 1 further comprising adding an air entraining agent different from said polyoxyalkylene copolymer.

21. A composition for entraining air in a hydraulic cementitious composition having an oxyalkylene shrinkage reduction admixture, comprising: a polyoxyalkylene copolymer having a molecular weight of at least 1000 or greater, said copolymer having a di-block structure

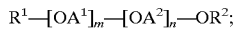

or

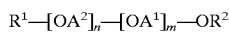

wherein $R^1$ and $R^2$ represent hydrogen, an alkyl group, a cyclo alkyl group, or an aryl group; $OA^1$ represents an oxyalkylene group wherein O represents oxygen and $A^1$ represents ethylene groups; and $OA^2$ represents an oxyalkylene group wherein O represents oxygen and $A^2$ represents propylene groups, butylene groups, or mixture thereof; m is an integer of 5–200; and n is an integer of 5–200; said composition further comprising at least one air entraining agent selected from the group consisting of a polyoxyalkylene polymer having a molecular weight less than 1000, a tall oil, a vinsol resin, a fatty alkanolamides, an ethoxylated fatty amine, ethoxylated fatty acid, ethoxylated triglyceride, ethoxylated alkylphenol, ethoxylated alcohol, alkyl ethoxylate, alkylaryl ethoxylate, a cationic air entraining agent, amphoteric air entraining agent, and anionic air entraining agent.

22. A cementitious composition comprising: a cement binder; at least one oxyalkylene shrinkage reduction admixture; a water soluble salt; and a polyoxyalkylene copolymer having a molecular weight of at least 1000 or greater, said copolymer having a di-block structure

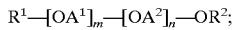

or

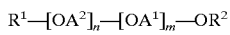

wherein $R_1$ and $R^2$ represent hydrogen, an alkyl group, a cyclo alkyl group, or an aryl group; $OA^1$ represents an oxyalkylene group wherein O represents oxygen and $A^1$ represents ethylene groups; and $OA^2$ represents an oxyalkylene group wherein O represents oxygen and $A^2$ represents propylene groups, butylene groups, or mixture thereof; m is an integer of 5–200; and n is an integer of 5–200; said shrinkage reduction admixture and said salt being present in the cementitious composition in the amount of 0.1–10% s/s based on the weight of cement in the composition, and said polyoxyalkylene copolymer being present in the cementitious composition in the amount of 0.005–5.0% s/s based on the weight of cement in the composition.

23. The composition of claim 22 further comprising an air entraining agent selected from an oxyalkylene glycol polymer, a tall oil, and a vinsol resin.

* * * * *